Aug. 22, 1961   R. L. SELF   2,996,796
APPARATUS FOR MANIPULATING ARTICLES
Filed Sept. 3, 1957   3 Sheets-Sheet 1
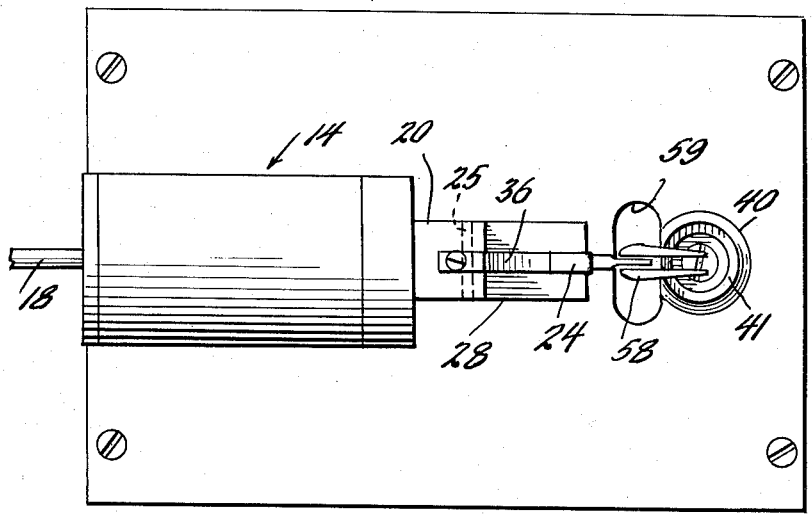
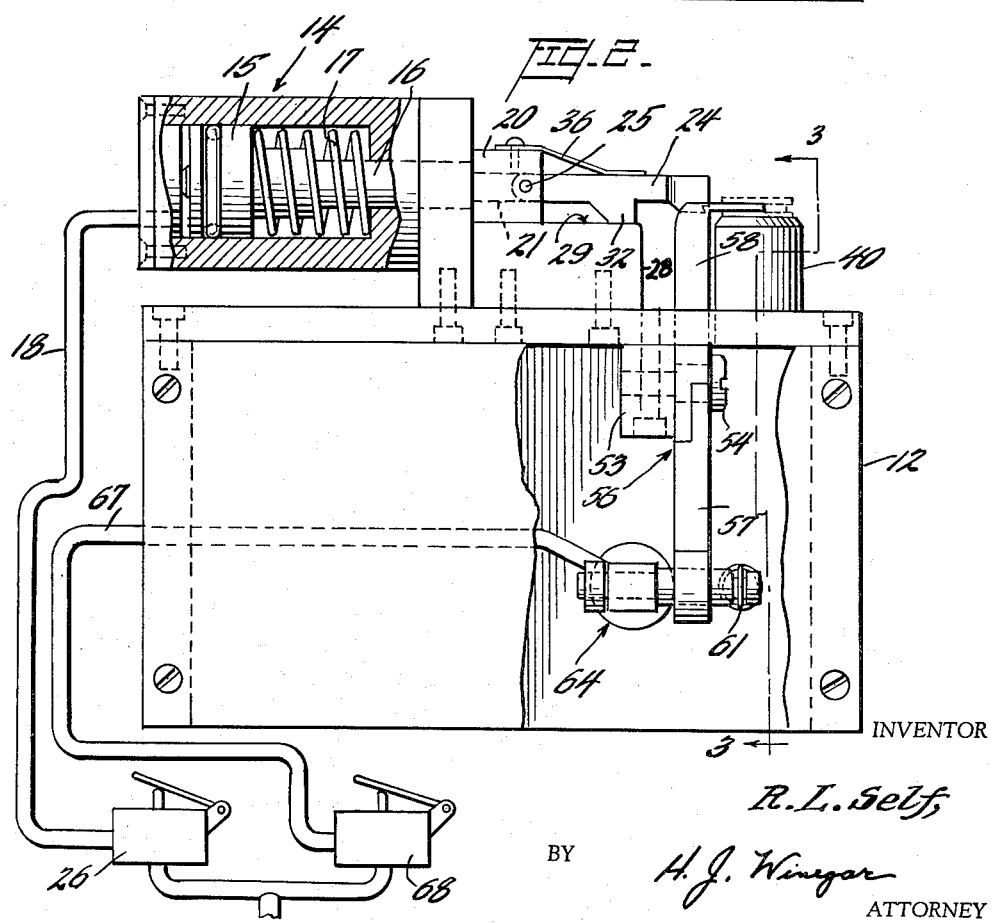
INVENTOR
R. L. Self,
BY H. J. Winegar
ATTORNEY

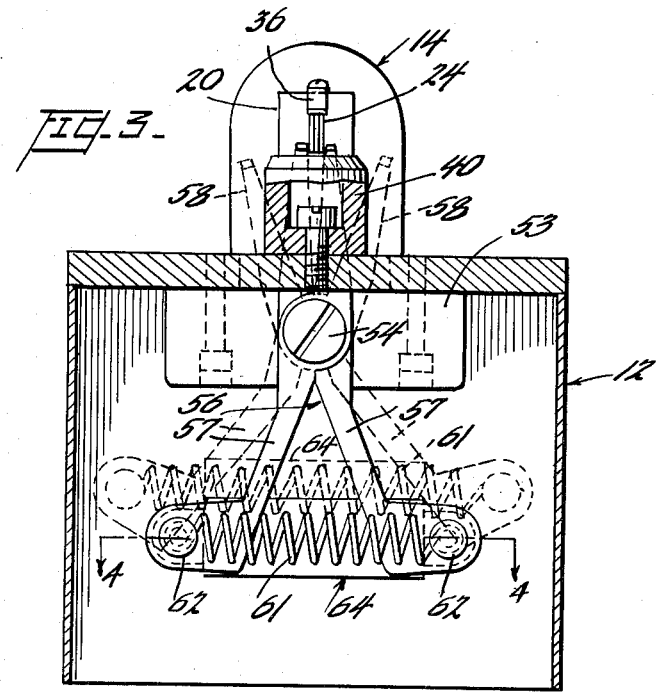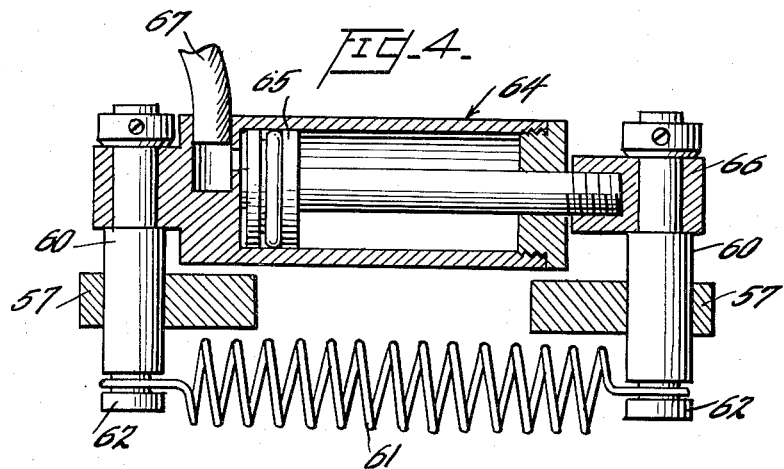

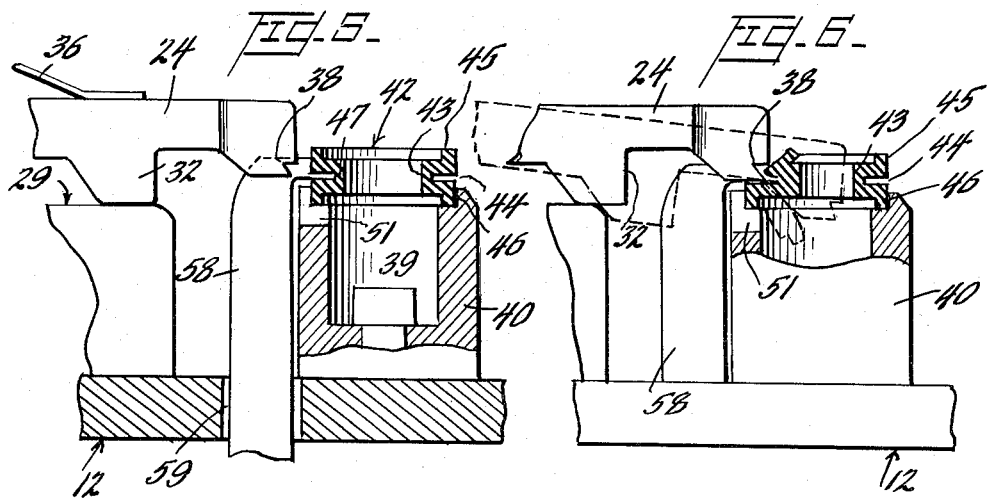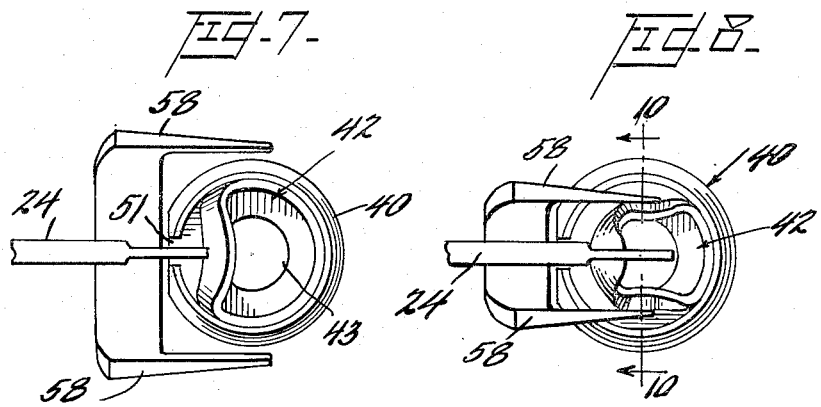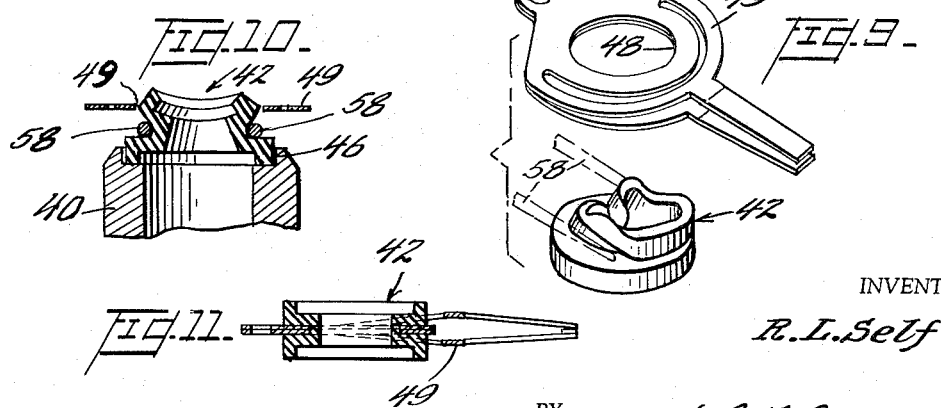

United States Patent Office 2,996,796
Patented Aug. 22, 1961

2,996,796
APPARATUS FOR MANIPULATING ARTICLES
Robert L. Self, Burlington, N.C., assignor to Western Electric Company, Incorporated, New York, N.Y., a corporation of New York
Filed Sept. 3, 1957, Ser. No. 681,576
11 Claims. (Cl. 29—235)

This invention relates to apparatus for manipulating articles and more particularly to apparatus for assembling soft rubber grommets in openings formed in workpieces.

Soft rubber grommets are commonly used as insulative retainers for electric wires passed through openings in metallic workpieces. A conventional type of grommet used for this purpose is generally tubular in configuration and is provided with enlarged peripheral flanges at either end which are larger in diameter than the opening formed in the workpiece. Conventional apparatus for assembling such grommets in workpiece openings have proved to be not entirely satisfactory if the workpiece is relatively fragile and small.

An object of this invention is to provide new and improved apparatus for assembling articles.

Another object of this invention is to provide new and improved apparatus for assembling soft rubber grommets in the apertures formed in workpieces.

Apparatus illustrating certain features of the present invention may include means for engaging a first peripheral portion of a tubular grommet near one extremity thereof and tucking the engaged peripheral portion into the central aperture in the grommet, and compressing means for squeezing other portions of the deformed peripheral portion together to capture the peripheral portion in its tucked position, the effective diameter of the thus deformed peripheral portion being substantially less than the diameter of the opening in a workpiece.

A complete understanding of the invention may be had from the following detailed description of a specific embodiment thereof when read in conjunction with the appended drawings, wherein:

FIG. 1 is a plan view of apparatus embodying the invention;

FIG. 2 is a side elevation of the apparatus, parts thereof being broken away for clarity;

FIG. 3 is an irregular vertical sectional view taken along the line 3—3 of FIG. 2 in the direction of the arrows;

FIG. 4 is an enlarged fragmentary horizontal sectional view taken substantially along the line 4—4 of FIG. 3 in the direction of the arrows;

FIG. 5 is an enlarged fragmentary view, partially in section, of a portion of the apparatus showing a grommet in position prior to being engaged by a tucking finger;

FIG. 6 is a view of portions of the apparatus shown in FIG. 5 showing in solid outline the initial engagement of the top flange of the grommet by the tucking finger and in dashed outline the position of the grommet at the forward stroke of the tucking finger;

FIG. 7 is a fragmentary plan view of portions of the apparatus in positions shown by the solid outline in FIG. 6;

FIG. 8 is a fragmentary plan view of the portions of the apparatus in positions shown by the dashed outline in FIG. 6, illustrating a subsequent step in the operation thereof, wherein spring-actuated pliers have engaged the grommet to capture a tucked portion of the top flange within the central aperture of the grommet;

FIG. 9 is an exploded view showing a subsequent step in the operation, the tucking finger having returned to its disengaged position, the tucked portion of the grommet captured by the pliers and an apertured workpiece directly above the grommet;

FIG. 10 is a sectional view taken substantially along the lines 10—10 of FIG. 8 in the direction of the arrows and also illustrating the workpiece being placed over a deformed upper flange of the grommet; and FIG. 11 is a view showing the grommet seated within an opening in the workpiece.

Referring now to the drawings, and in particular to FIG. 2, apparatus illustrating a specific embodiment of the invention includes a base housing 12, the bottom of which is open to provide access to various moving parts to facilitate the adjustment thereof. Fixedly secured to the top surface of the base housing 12 is an air cylinder 14 provided with a piston 15, a plunger 16, and a coiled return spring 17. Attached to an inlet port on the air cylinder 14 is a hose 18 which communicates with a supply of compressed air (not shown) through a normally closed, foot-operated valve 26.

The plunger 16 is provided at its free end with a square collar 20. The end of the plunger 16 is received within a bore 21 provided in the square collar 20 and is attached pivotally to a tucking finger 24 by means of a dowel pin 25, which also connects the end of the plunger to the square collar. The bottom surface of the square collar 20 is slidably supported by a bearing surface 29 provided on a cam block 28.

The cam block 28 is mounted fixedly to the top surface of the base housing 12. As may be seen, particularly in FIGS. 1 and 2, the tucking finger 24 is elongated and provided with a depending cam follower 32 intermediate the ends thereof, which contacts slidably the bearing surface 29 of the cam block 28. The tucking finger 24, which is connected pivotally to the free end of the plunger 16 and the square collar 20, is urged downwardly resiliently against the bearing surface 29 of the cam block 28 by a flat leaf spring 36 suitably secured to the square collar 20. The free or leading end of the tucking finger 24 is reduced in cross section and provided with a generally V-shaped notch 38 located at the bottom of its leading edge, FIG. 5.

Secured rigidly to the top surface of the base housing 12, by a threaded fastener 39, is a hollow, generally cylindrical grommet supporting and positioning column 40. The top of the column 40 is counterbored to provide an annular recess 41, FIG. 1, designed to receive a soft rubber grommet 42 and to position the grommet accurately with respect to the tucking finger 24.

The rubber grommet 42 is of a conventional type which is generally cylindrical and tubular in shape and has a central aperture 43 extending therethrough. The grommet 42 (see FIG. 5) is provided with an exterior peripheral groove 44 which separates the grommet into two peripheral flanges 45 and 46, joined together by a shank 47 of reduced diameter. The top flange 45 and the bottom flange 46 of the grommet 42 are substantially larger in diameter than the diameter of a circular opening 48 provided in a workpiece 49 (see FIG. 9), whereas the diameter of the shank 47 of the grommet is equal to or less than the diameter of the opening. The grommet 42 is formed from a relatively soft resilient material, such as natural rubber, neoprene compound, or the like, which may be readily deformed by the application of a suitable force.

When the grommet 42 is properly seated in the recess 41, formed in the column 40, portions of the lower flange 46 extend above the top surface of the column so that the pheripheral groove 44 and the top flange 45 are completely exposed and readily accessible for operations thereon as illustrated in FIG. 5. A slot 51 is provided in the column 40 to provide a passageway for the reciprocal tucking finger 24 when the latter is moved to its extended position by the operation of the air cylinder 14, which position is illustrated in dashed outline in FIG. 6.

Referring again to FIG. 2, there is shown a bracket 53 which is secured to and depends perpendicularly from the underside of the top surface of the base housing 12. Pivotally secured to the bracket 53 by means of a partially threaded pivot member 54 is a pair of modified, needle-nosed pliers 56 having pivotally interconnected handle members 57—57 formed integrally with needle-nosed jaws 58—58. The end portions of the jaws 58—58 are bent at right angles to the main body of the pliers 56, as shown in FIG. 2. The jaws 58—58 extend upwardly through an elongated opening 59 (FIG. 1) formed in the top surface of the base housing 12 with the bent end portions of the jaws extending forwardly over the top surface of the column 40 in parallel spaced relation thereto. In their open position, the end portions of the jaws 58—58 straddle a grommet 42 seated in the recess 41, as shown in FIG. 7.

Fastened to the lower ends of handle members 57—57 of pliers 56 (FIGS. 3 and 4) by means of rods 60—60, is a mechanism for opening and closing the jaws 58—58 of the pliers.

A tension spring 61 is fastened around studs 62—62 of rods 60—60 and normally urges the handle members 57—57 together to close the jaws 58—58. An air cylinder 64, when operated, functions to open the jaws 58—58. The air cylinder 64 is mounted on rods 60—60 between the handles 57—57 of the pliers 56, as viewed in FIG. 4, and is provided with a plunger 65 and connecting block 66.

Attached to an inlet port on the air cylinder 64 is a hose 67 which communicates with a supply of compressed air (not shown) through a normally closed foot-operated valve 68. As may be seen in FIGS. 3 and 4, relative motion will occur between plunger 65 and the air cylinder 64 when air under pressure is admitted to the air cylinder 64, due to the manner in which air cylinder 64 is mounted. The plunger 65 will move to the right with the attached handle member 57 and the air cylinder 64 will move to the left carrying the other handle member 57 to the left. This opposed movement overcomes the tension of spring 61 to spread handles 57—57 apart, thus opening the jaws 58—58 of the pliers 56. The pliers then occupy the dashed-line position illustrated in FIG. 3. When the air in the air cylinder 64 is exhausted, the spring 61 will contract closing the handles 57—57 and jaws 58—58 of the pliers 56 and return the air cylinder 64 to its inoperative position.

In order to facilitate a description of the above described apparatus, let it be assumed an operator desires to place a soft rubber grommet 42 within the opening 48 formed in a workpiece 49. In addition, it will be assumed the apparatus at the start is in its inoperative position as illustrated in FIGS. 1 and 2.

The operator first actuates the valve 68 to admit compressed air to the air cylinder 64. Operation of the air cylinder 64 opens the pliers 56 spreading the jaws 58—58 to positions indicated by the dashed outlines thereof in FIG. 3, to permit the operator to position a rubber grommet 42 in the annular recess 41 in the top of the column 40, as viewed in FIG. 5. With the grommet 42 seated in the recess 41, the operator holds the valve 68 in its actuated position to keep the jaws 58—58 of the pliers 56 spread apart and also actuates valve 26 to operate the air cylinder 14 whereupon the piston 15 moves forward.

On the forward stroke of the piston 15, the return spring 17 is compressed and the plunger 16 is moved to the right, as viewed in FIG. 2, moving the square collar 20 and the pivotally attached tucking finger 24 with it. The tucking finger 24 moves forward with its depending cam follower 32 sliding on the bearing surface 29 of the cam block 28. During this forward motion the leading end of the tucking finger 24 engages a portion of the top flange 45 of the grommet 42, as illustrated in FIGS. 5 and 6, and forces the engaged portion radially inwardly as viewed in FIG. 7. The forward movement continues until the depending cam follower 32 rides off the rounded front end of the cam block 33. When the latter action occurs, the downward force imparted to the tucking finger 24, by the flat spring 36, causes the tucking finger 24 to pivot clockwise to cause the leading end of the tucking finger 24 to tuck the engaged portion of the top flange 45 downwardly into the central aperture 43 of the grommet, as indicated by the dashed lines in FIG. 6.

The operator next releases the valve 68, allowing it to close and the air to be exhausted from the air cylinder 64. The spring 61 then contracts pulling the handles 57—57 of the pliers 56 together and tending to close the jaws 58—58 of the pliers with a predetermined force. As the jaws 58—58 of the pliers 56 close, they engage the peripheral groove 44 of the grommet just above the lower flange 46 and squeeze opposite portions of the grommet toward each other to capture the tucked portion of the top flange 45 within the central aperture 43, as illustrated in FIG. 8. This reduces the effective diameter of the top flange 45 considerably.

With the top flange 45 of the grommet 42 thus deformed and held by the jaws 58—58, of the pliers 56, the operator releases the valve 26 to exhaust the air cylinder 14. As the air cylinder 14 is exhausted, return spring 17 expands causing plunger to retract to the left, as viewed in FIG. 2, and consequently returning the tucking finger 24 to its disengaged position. As viewed in FIG. 9, the top flange 45 is held in its deformed condition by the jaws 58—58 of the pliers 56, the effective diameter thereof being small enough to permit the operator to place the apertured workpiece 49 over the deformed top flange, as viewed in FIG. 10. Having slipped the workpiece 49 over the deformed top flange 45, the operator again actuates the valve 68 to operate the air cylinder 64 and open the pliers 48. Upon being released by the jaws 58—58, the deformed top flange 45, of the grommet 42, returns to its undeformed shape seating the grommet 42 in a circular opening 48 of the workpiece 49 as illustrated in FIG. 11. The operator may now remove the assembled article from the apparatus and repeat the above operation for additional articles.

It is manifest that the above-described embodiment of the invention is merely illustrative and that numerous modifications may be made within the spirit and scope of the invention. Further, it will be understood that the particular grommet illustrated is only an example of one type of grommet which may be operated upon in practicing the invention, and that the invention is not limited to use with this one type of grommet.

What is claimed is:

1. A device for inserting a tubular resilient grommet into an opening formed in a workpiece, which comprises a support, a first means mounted on the support for tucking a portion of the tubular grommet into the hollow interior thereof, second means attached to the support in spaced relation to the first means for compressing other portions of the grommet adjacent to the first portion to thereby capture the first portion in its tucked position and cause the effective diameter of the thus deformed extremity to be less than the diameter of the opening in the workpiece, and means coupled operatively to the first and second means for sequential actuation thereof.

2. A device for inserting an apertured resilient grommet into an opening formed in a workpiece, said grommet having an enlarged peripheral flange larger in diameter than the diameter of the opening in the workpiece, which comprises a support, a first means mounted on the support for tucking a portion of the flange into a central aperture in the grommet, second means attached to the support in spaced relation to the first means for compressing other portions of the grommet together to capture the first portion in its tucked position, and cause the effective diameter of the thus deformed flange to be less than the diameter of the opening in the workpiece, and means coupled operatively to the first and second means for sequential actuation thereof.

3. A device for inserting an apertured resilient grommet into an opening formed in a workpiece, said grommet having an enlarged peripheral flange normally larger in diameter than the diameter in the opening of the workpiece, which comprises a movable tucking finger, means for operating the tucking finger to tuck a portion of the flange into a central aperture in the grommet, compressing means for squeezing other portions of the grommet together to capture the first portion in its tucked position, means for retracting the tucking finger to leave the said first portion captured whereby the effective diameter of the thus deformed flange is sufficiently smaller than the diameter of the opening in the workpiece to permit it to be inserted therein, and means coupled operatively to the operating means, compressing means, and retracting means for sequential actuation thereof.

4. A device for inserting an apertured resilient grommet into an opening formed in a workpiece, said grommet having a reduced tubular shank with an enlarged peripheral flange normally larger in diameter than the diameter in the opening of the workpiece, which comprises a movable tucking finger, means for operating the tucking finger to tuck a portion of the flange into a central aperture in the grommet, a pair of compressing elements for squeezing other portions of the grommet together to capture the first portion in its tucked position, means for retracting the tucking finger to its disengaged position leaving the first portion in its tucked position, the effective diameter of the thus deformed flange being sufficiently smaller than the diameter of the opening in the workpiece to permit it to be inserted into the opening, and means operatively connected to the operating means, compressing elements, and retracting means for sequential actuation thereof.

5. A device for inserting an apertured resilient grommet into an opening formed in a workpiece, said grommet having an enlarged peripheral flange larger in diameter than the diameter of the opening in the workpiece, which comprises a base, a locating column mounted on said base, said locating column having a recess for receiving and positioning such a grommet, a movable tucking finger, means for operating the tucking finger to cause said finger to tuck a portion of the flange of a grommet located in the recess radially into a central aperture formed in the grommet, compressing means for squeezing other portions of the grommet together to capture the first portion in its tucked position, means for retracting the tucking finger to its disengaged position leaving the first portion captured whereby the effective diameter of the thus deformed flange is sufficiently smaller than the diameter of the opening in the workpiece to permit the deformed flange to be inserted into said opening, and pneumatic means operatively connected to the operating means, compressing means, and retracting means for sequential actuation thereof.

6. A device for inserting an apertured resilient grommet into an opening formed in a workpiece, said grommet having around the aperture an enlarged peripheral flange larger in diameter than the diameter of the opening in the workpiece, which comprises a base, a locating column mounted on said base and provided with an annular recess for receiving and positioning such a grommet, a movable tucking finger, means for operating the tucking finger to an extended position to cause said finger to engage a portion of the flange on a grommet in the recess, means for moving the tucking finger downwardly during a latter part of its movement to its extended position whereby said finger tucks the engaged portion radially inwardly and axially downwardly into the aperture in the grommet, compressing, means for squeezing other portions of the grommet together over the tucked portion thereof to capture the latter portion in its tucked position, means for retracting the tucking finger out of contact with the flange thus leaving the tucked portion of the flange captured whereby the effective diameter of the deformed flange is sufficiently smaller than the diameter of the opening in the workpiece to permit it to be inserted into said opening, and pneumatic means operatively connected to the operating means, compressing means, and retracting means for sequential actuation thereof.

7. A device for inserting an apertured resilient grommet into an opening formed in a workpiece, said grommet having an enlarged peripheral flange larger in diameter than the diameter of the opening in the workpiece, which comprises a base, a locating column mounted on said base and provided with an annular recess for receiving and positioning such a grommet, a movable tucking finger mounted on the base adjacent the locating column, means connected to the tucking finger for moving said tucking finger to an extended position to engage a portion of the flange of a grommet seated in the recess, means mounted on the base for moving said tucking finger downwardly during a latter part of its movement to its extended position to tuck said portion radially inwardly and axially downwardly into the aperture in the grommet, a pair of jaws mounted on the base adjacent the locating column for squeezing other portions of the grommet together to capture the first portion in its tucked position, means mounted on the base for retracting the tucking finger out of contact with the flange leaving the tucked portion of the flange captured whereby the effective diameter of the thus deformed flange is sufficiently smaller than the diameter of the opening in the workpiece to permit it to be inserted into said opening, means for opening said jaws to allow the deformed flange to return to its underformed shape, thereby seating the grommet within the aperture of the workpiece and pneumatic means operatively connected to the moving means, jaws, retracting means, and opening means for sequential actuation thereof.

8. A device for constricting the effective diameter of a portion of a resilient member, which comprises means for moving a portion of the member into the interior thereof in a tucked position, means for compressing other portions of the member to capture the tucked portion in the tucked position, and means for sequentially operating said first and second means.

9. A device for constricting the effective diameter of a portion of a resilient member, which comprises a tucking finger for moving a portion of the resilient member toward the center thereof into a tucked position, a plurality of movable jaws for compressing other portions of the resilient member adjacent the first portion to capture it in the tucked position, and means for sequentially operating said tucking finger and then said jaws.

10. A device for constricting the effective diameter of a flange extending from a resilient grommet, which comprises a movable finger for tucking a portion of the flange into the interior of the grommet, a pair of jaws movable normal to the motion of the tucking finger for compressing a portion of the grommet adjacent the tucked portion to thereby capture it in the tucked position, and means for sequentially operating said tucking finger and then said pair of jaws.

11. A device for constricting the effective diameter of a flange on an apertured resilient grommet, which comprises a base, a locating column mounted on the base and provided with an annular recess for receiving and positioning a grommet, a movable tucking finger mounted on the base, actuating means for moving the tucking finger to an extended position to engage a portion of the flange on a grommet seated in the recess, means mounted on the base for moving said tucking finger downwardly during a latter part of its movement to thereby tuck said portion of the flange radially inwardly and axially downwardly into an aperture in the grommet, jaws mounted on the base for movement to compress other portions of the grommet together over the tucked portion thereof to capture it in the tucked position, means for retracting the tucking finger out of contact with the flange thus leaving the tucked portion of the flange captured, and means for sequentially operating said actuating means, jaws, and retracting means.

References Cited in the file of this patent

UNITED STATES PATENTS

| | | |
|---|---|---|
| 2,374,358 | Kling | Apr. 24, 1945 |
| 2,457,930 | Smith | Jan. 4, 1949 |
| 2,466,952 | Jakubowski | Apr. 12, 1949 |
| 2,468,286 | Behlert | Apr. 26, 1949 |
| 2,559,847 | Brickman | July 10, 1951 |
| 2,657,818 | Mueller | Nov. 3, 1953 |
| 2,759,255 | Prince | Aug. 21, 1956 |
| 2,763,055 | Hardy | Sept. 18, 1956 |
| 2,875,512 | Rau | Mar. 3, 1959 |